(12) United States Patent
Choudhery et al.

(10) Patent No.: US 6,767,956 B2
(45) Date of Patent: Jul. 27, 2004

(54) EXTRUSION PROCESS

(75) Inventors: Riaz Ahmad Choudhery, West Midlands (GB); Kenneth Andrew Murray, Maidenhead (GB); Stephen Barry Downing, High Wycombe (GB); David John Southgate, Upper Bucklebury (GB)

(73) Assignee: Imperial Chemical Industries plc (GB)

( * ) Notice: Subject to any disclaimer, the term of this patent is extended or adjusted under 35 U.S.C. 154(b) by 0 days.

(21) Appl. No.: 10/220,376

(22) PCT Filed: Feb. 27, 2001

(86) PCT No.: PCT/EP01/02320

§ 371 (c)(1),
(2), (4) Date: Mar. 11, 2003

(87) PCT Pub. No.: WO01/64774

PCT Pub. Date: Sep. 7, 2001

(65) Prior Publication Data

US 2003/0176564 A1 Sep. 18, 2003

(30) Foreign Application Priority Data

Mar. 2, 2000 (GB) .............................. 0004898

(51) Int. Cl.$^7$ .................................. C08J 3/05
(52) U.S. Cl. ................ 524/582; 524/586; 524/604; 524/605; 366/77
(58) Field of Search ............................ 366/77; 523/348, 523/319, 322, 323; 524/502–536, 582, 586, 604, 605

(56) References Cited

U.S. PATENT DOCUMENTS

| 3,356,629 | A | * | 12/1967 | Smith et al. ................ 523/348 |
| 3,422,049 | A | * | 1/1969 | McClain .................... 528/326 |
| 3,432,483 | A | * | 3/1969 | Peoples et al. ............. 528/494 |
| 4,123,403 | A | * | 10/1978 | Warner et al. .............. 523/313 |
| 4,174,335 | A | * | 11/1979 | Ohdaira et al. ............. 524/522 |
| 4,252,969 | A | * | 2/1981 | Broering et al. ............ 528/492 |
| 4,320,041 | A | | 3/1982 | Abe et al. |
| 4,778,835 | A | | 10/1988 | Sittel et al. |
| 4,996,259 | A | | 2/1991 | Koehler et al. |
| 5,272,200 | A | * | 12/1993 | Yamauchi et al. .......... 524/503 |
| 5,354,804 | A | * | 10/1994 | Inada et al. ................. 524/503 |
| 5,816,700 | A | | 10/1998 | Starke et al. |
| 6,512,024 | B1 | * | 1/2003 | Lundgard et al. ........... 523/335 |

FOREIGN PATENT DOCUMENTS

| DE | 10 846 A | 12/1955 |
| DE | 26 32 869 A | 2/1977 |
| EP | 0 063 472 A | 10/1982 |
| EP | 0 497 404 A | 8/1992 |
| FR | 1577495 A | 8/1969 |
| GB | 617907 A | 2/1949 |
| GB | 1034154 A | 6/1966 |
| GB | 1517828 | 7/1976 |
| JP | 54153899 A | 12/1979 |
| JP | 62195026 A | 8/1987 |
| JP | 10139884 A | 5/1998 |
| WO | WO-93/02125 A | 2/1993 |
| WO | WO 97/15705 | 5/1997 |
| WO | WO97/45476 | * 12/1997 |

OTHER PUBLICATIONS

Derwent abstract ACC–NO.: 2003–542770, of DE 10109992 A1 (Sep. 5, 2002) Guentherberg et al.*
M.R. Kamal, R.A., Lai Fock and T. Yalcinyuva, Reactive Extrusions for the Hydrolytic Depolymerization of Polyethylene Terephthalate, ANTEC '94.

* cited by examiner

Primary Examiner—Matthew A. Thexton
(74) Attorney, Agent, or Firm—Kenneth J. Stachel

(57) ABSTRACT

A process for producing an aqueous dispersion of a polymer in an aqueous medium having a viscosity below 10 Pa.s, in which the polymer is dispersed in an aqueous medium in an extruder at a temperature above 100° C., the pressure inside the extruder being maintained above atmospheric pressure so that the aqueous medium does not boil inside the extruder.

8 Claims, No Drawings

EXTRUSION PROCESS

This invention relates to processes for producing aqueous dispersions of finely divided polymer, and for making powders from these dispersions, to aqueous dispersions made by the process and to powders made from the dispersions. It also relates to coating compositions comprising the finely divided polymer, to a coating process using the compositions and to a coated substrate resulting from the process.

Finely divided solid polymers, either in powder form or as dispersions in a carrier liquid are useful for a number of applications including coatings. For use in coatings and adhesives, it is important that the polymer be very finely divided so that when the powder or dispersion is applied to a substrate surface, it can be heated and melted into a thin film with sufficient flow-out to give a smooth coating.

Grinding solid polymers into fine powders is inconvenient and costly. Only polymers that are brittle and amenable to dry milling when cold can be ground up efficiently. In particular, the grinding process itself generates heat which must be removed by cooling to avoid the polymer melting and fusing into a solid mass again. Also, grinding results in irregularly shaped particles and in a broad size distribution, neither of which are ideal for coatings.

As an alternative to grinding, it is known that dispersions of polymers which are solid at normal temperatures can be made in certain carrier liquids by using an extruder, for example as shown in U.S. Pat. No. 5,124,073. Extruders are conveying single or multi-screw mixers. The use of an extruder enables polymers of high viscosity to be readily dispersed in liquids in a continuous process. In general the polymer is fed into the extruder in pellet form and is heated as it passes down the extruder barrel at least until it becomes sufficiently liquid to be dispersed. The carrier liquid and a dispersant are added through an inlet port along the extruder barrel at a point at which the polymer is liquid enough to disperse. The combined effect of heating the polymer so that it is liquid, and the shear applied by the extruder in the presence of the carrier liquid and dispersant results in the formation of fine polymer dispersions. These can be cooled to solidify the polymer once more so as to produce a dispersion of solid polymer particles in the liquid carrier. When stable dispersions are required, then a stabiliser is usually included in the mixture, usually in the carrier liquid. Alternatively, where powders are desired, the polymer can be allowed to settle out and centrifuged and filtered off and dried. The result of such a known process is spherical particles of polymer of a reasonably uniform size.

U.S. Pat. No. 4,996,259 describes aqueous synthetic wax dispersions which can be used as coating films, and which comprise a partially or completely neutralised copolymer of a $C_2$–$C_4$ olefin, and an unsaturated mono or dicarboxylic acid or dicarboxylic anhydride. The preparation is carried out by neutralising and dispersing the solid material in water in an extruder.

There are, however, limitations to this extrusion process. Clearly, the mixture can not be heated above the boiling point of the carrier liquid, or else the liquid boils and it becomes impossible to disperse the polymer. This means that the boiling point of the carrier liquid must be a safe margin above the temperature at which the polymer is sufficiently liquid to disperse. The process by which the polymer becomes liquid enough to disperse can be generally referred to as melting and the temperature at which the polymer is liquid enough to disperse can be generally referred to as its melting point (Tm). Many polymers that are useful for coatings have melting points above about 90° C. and some above 150° C., for example crystalline polyesters melt at around 120 to 250° C. For these polymers the use of the known extruder process to produce dispersions in water is not possible.

EP-A-0 246 729 describes the use of an extruder to produce what are called aqueous dispersions at extruder temperatures above 100° C. The types of compositions made in this process comprise a polymer and only 3 to 25% by weight of water. These compositions are apparently solid, and are not free-flowing aqueous dispersions suitable for coating compositions. The apparatus used comprises a heated extruder which has a cooling device at its outlet. The combination of the high level of viscous resin and the cooling device appears to create a viscous plug at the extruder outlet, and this plug causes the pressure inside the heated portion of the extruder to rise so as to prevent the water from boiling. Clearly, this process cannot be used when the dispersions produced by the process are of lower viscosity, because no plug would be formed. Such lower viscosity dispersions are generally those with a higher level of water.

The present process represents a modification of the known extrusion processes to allow the production of novel aqueous fine liquid dispersions of polymers having a melting point close to or above 100° C., for example above 90° C.

According to the present invention there is provided a process for producing an aqueous dispersion of a polymer in an aqueous medium, the dispersion having a Brookfield viscosity below 10 Pa.s, in which the polymer is dispersed in an aqueous medium in an extruder at a temperature above 100° C., the pressure inside the extruder being maintained above atmospheric pressure so that the aqueous medium does not boil inside the extruder.

Preferably the dispersion has a viscosity of less than 5 Pa.s and more preferably below 1 Pa.s.

Describing a typical process, the polymer is metered in the form of pellets into the intake of the extruder, where it is melted in the initial melt zone of the extruder at a temperature above the melting point of the polymer, preferably from 5 to 150° C., typically 10 to 130° C., above the melting point. Any other non-volatile components required in the composition, such as pigments or other additives can be fed in along with the polymer.

As the material passes down the extruder barrel, the melt zone is followed by one or more inlet ports through which aqueous medium is injected under pressure, optionally along with a dispersant. In the portion of the extruder following the inlet ports the mixture of aqueous medium and polymer are subjected to shear in the dispersion zone so as to form a dispersion. The aqueous medium can be injected in one portion to produce a dispersion of the polymer in the aqueous medium. Alternatively and preferably, initially a smaller proportion of aqueous medium can be injected, typically along with dispersant, which is believed to form a dispersion of the aqueous medium in the polymer, and this can be followed by more aqueous medium so as to make the required dispersion of polymer in aqueous medium.

At this stage, the polymer is molten and the dispersion comprises droplets of dispersed polymer. Finally, a cooling zone is used to lower the temperature of the dispersion below the melting point, Tm, of the polymer so as to produce a dispersion of solid polymer particles in the aqueous medium.

The pressure in the extruder can be maintained by putting a pressure control device such as a pressure relief valve at the extruder outlet. Alternatively, and preferably, the pressure can be maintained by connecting the outlet of the extruder to a pressurised collection vessel. The use of a pressurised collection vessel is preferred because pressure relief valves are prone to blocking up because of the small exit aperture.

The pressure inside the extruder is maintained so as to prevent the water in the aqueous medium from boiling and so the exact pressure will depend on the temperature at which the dispersion is carried out. The pressure required to prevent water from boiling at various temperatures above 100° C. is well known or can easily be calculated. For example a pressure of at least 3 bar at 130° C., of at least 5 bar at 150° C., and at least 10 bar at 180° C. will prevent the water from boiling. The exact pressure can be chosen to give a safety margin in the event of overheating but there is no real benefit in using a much higher pressure than that required to prevent boiling. The extruder is preferably a continuous twin-screw extruder. An example of a suitable extruder is a Leistritz co-rotating twin screw micro-18 GL 40D™.

The polymer is a solid or highly viscous liquid at normal temperatures, preferably solid. By highly viscous polymer is meant polymers of viscosity preferably greater than 100 Pa.s measured at a shear rate of $10\ s^{-1}$ at 20° C. By solid is meant that it is solid at 20° C.

Examples of suitable polymers are polyesters, polyamides, polycarbonates, polyolefins, polyurethanes, polyureas, polyimides, phenoxy resins and blends thereof and optionally other polymers capable of reacting with curing agents and crosslinkers. Preferred polymers are polyesters and polyolefins. In particular, crystalline polyesters and polyolefins are preferred when the polymer dispersions are to be used for coatings. Preferably it is a crystalline polyester. Crystalline polymers normally present particular difficulties when making aqueous dispersions by extrusion because of their high melting point.

Where the polymer is a polyester it is typically made from a glycol and a di-acid and optionally branching agent. Examples of useful glycols are ethylene glycol, propylene glycol, 1,4 butane diol, 1,6 hexane diol, di-ethylene glycol, cyclohexane dimethylol. Examples of useful di-acids are terephthalic acid, isophthalic acid, naphthalene di-carboxylic acid, maleic acid, adipic acid, sebacic acid and cyclohexane di-carboxylic acid. Examples of useful branching agents are tri-methylol propane, pentaerythritol and trimellitic anhydride. Examples of useful polyesters are polyethylene terephthalate (PET), polybutylene terephthalate (PBT), copolymers of ethylene glycol and a mixture of terephthalic and isophthalic acids (PET/I), copolymers of PET or PBT with aliphatic diacids and isophthalic acid, and polyethylene naphthenate (PEN).

Examples of useful polyamides are Nylon 6, Nylon 6,6, Nylon 6,10, Nylon 6,12, Nylon 4,6, Nylon 11, and aromatic nylons which are polyamides comprising condensates of aromatic diamines such as 1,3-di(amino methyl) benzene.

Examples of useful polycarbonates are 2,2-bis(4 hydroxyphenol) propane (bisphenol A) polycarbonate, commercially available from Enichem Spa of Italy under the Sinvet trade mark.

Examples of useful polyolefins are homopolymers or copolymers of ethylene and/or propylene. Useful examples of homopolymers are linear low density polyethylene, high density polyethylene and polypropylene. Useful examples of copolymers are copolymers of ethylene with up to 40% by weight of other alpha-olefins or olefinically unsaturated carboxylic acids or esters such as vinyl acetate or lower (for example $C_1$ to $C_4$) alkyl acrylates or methacrylates. Other useful examples of copolymers are copolymers of ethylene and vinyl alcohol. Useful polypropylene copolymers include copolymers comprising up to 15% by weight of ethylene. Polyolefins can be usefully blended with each other or up to 30% by weight of ethylene/propylene rubbers.

The polymer can have a melting point above 90° C. and still be made into fine aqueous dispersions. Preferably the melting point of the polymer is above 130° C., more preferably above 140° C. and most preferably above 150° C. Polymers with melting points below 90° C. can also be used but for these polymers there may be little benefit in using pressures above normal atmospheric.

The aqueous medium is one that comprises largely water. There can be up to 40% by weight of water miscible organic solvents present in the aqueous medium. When the solvent has a boiling point lower than that of water, the pressure in the extruder may need to be raised to prevent the solvent from boiling. Preferably there is little or no organic solvent in the aqueous medium, for example less than 30% by weight, more preferably less than 10% by weight and most preferably less than 5% by weight.

Preferably the dispersion contains greater than 25% by weight of aqueous phase, more preferably greater than 30% and most preferably greater than 35%.

The dispersant is a material that helps to emulsify the polymer melt, and can stabilise the dispersed polymer particles to prevent flocculation or settlement. A typical dispersant is polyvinyl alcohol which is preferably partially hydrolysed. Alternatively, a water dispersible acid functional acrylic polymer dispersant can be used such as a lauryl methacrylate/acrylic acid copolymer.

The particle size of the dispersed polymer depends on the viscosity of the molten polymer, and hence on the characteristics of the polymer and on the temperature in the dispersion zone. It also depends on the applied shear and hence on the speed and screw configuration of the extruder. The process can be used to produce polymer dispersions having an average particle size of less than 10 μm which is very difficult to achieve using a grinding process. Because of the process by which they are made, the particles are spherical. The small size of the particles and their spherical shape makes them particularly useful for coatings and adhesives. They are especially useful in coatings applications where a thin coating film is required, for example where films below 10 μm thickness are desired, such as in the coating of food and drinks cans. Preferred particle sizes for liquid coating compositions are 0.1 to 20 μm and for powder coating applications the preferred range is 1 to 50 μm.

Other conventional coating ingredients such as pigments, fillers, heat stabilisers, light stabilisers, biocides, thickeners, curing agents, crosslinkers, surfactants can also be added. These can be included with the polymer as it is put into the extruder, injected with the aqueous medium, or can be added to the final dispersion.

The dispersions can be further processed to remove excess dispersant, for example by centrifuging and decanting the supernatant and optionally redispersing in clean water, to reduce any water sensitivity in the final films introduced by the dispersant.

The process of the invention allows for the first time the preparation of low viscosity aqueous dispersions of polymers having a melting point above 90° C. According to the present invention there is provided an aqueous dispersion of essentially spherical particles of polymer selected from the group consisting of polyesters, polyamides, polycarbonates, polyolefins, polyurethanes, polyureas, polyimides and phenoxy resins having a viscosity below 10 Pa.s, in which the polymer has a melting point above 90° C. In particular, the process allows, for the first time, the preparation of aqueous dispersions of essentially spherical particles of crystalline polyesters, which require heating to above 150° C. to melt them, without any substantial degradation of the polymer by reaction with water. This is because of the relatively short time that the polymer dispersion remains heated above the polymer melt temperature, in contrast to batch processes where the polymer dispersion is held at temperatures above the polymer melt temperature for longer. Also, because the polymer is dispersed in the melt, and not ground up, the dispersed polymer particles are spherical rather than irregularly shaped. Spherical particles are preferred because they tend to give rise to better flow out in final coating films compared to irregularly shaped particles from grinding. Polymer dispersions can also be made which are free of organic solvent.

The resultant particles can be used in coating applications either in dispersed form or in the form of a powder where the polymer particles have been isolated from the aqueous medium. The polymer particles can be isolated by conventional techniques such as filtering, spray drying, freeze drying, centrifuging or decanting and oven drying. Isolated particles can be redispersed in another liquid carrier if desired.

The present invention provides a coating composition comprising polymer particles, either in dispersion or as a powder, as the main film-forming component. The coating composition can also comprise other conventional coatings components such as pigments, crosslinkers, flow additives and UV stabilisers. These additional components can be mixed into the composition after the dispersion process but are preferably added to the polymer before it enters the extruder so that they are incorporated into the polymer melt in the extruder before it is dispersed.

The present invention also relates to a process of coating comprising applying the polymer particles, either in dispersion or as a powder, to a substrate and heating so as to form a continuous film. The liquid coating or adhesive compositions can be applied to a substrate by conventional means such as brushing, spraying, dipping or roller coating. Powder coatings can be applied by spraying or fluidised bed. Suitable substrates include metals such as steel, aluminium and tin, and non-metals, such as masonry, wood, plastic and glass. The layer can be dried by heating to a temperature at which the polymer melts and flows to form a continuous film, for example to 100° C. to 250° C. for 20s to 30 minutes. The present invention also relates to a substrate coated by this process.

The invention will now be illustrated by means of the following examples;

EXAMPLE 1

An aqueous dispersion was prepared as follows. Pellets of a crystalline polyester polymer 88EG™ from Bostik were added at a rate of 3 kg/hour to the inlet of a Leistritz co-rotating twin screw micro-18 GL 40D™ extruder, the screws rotating at 350 revolutions per minute. The pressure at the extruder exit was maintained at 8 bar by means of a self-regulating pressure relief valve. The eight heater zones in the extruder were set to maintain the following temperature profile (in °C.) from inlet to outlet;

180-280-240-150-150-150-150-150.

In the third zone was an injection port through which was injected aqueous dispersant (88% hydrolysed polyvinyl alcohol, 30% by weight in water, sold as Gohsenol GL05™) at 1 kg/hour. In the fifth zone was an injection port through which was injected water at 4 kg/hour, under pressure at 150° C.

The resulting polymer dispersion had a median particle size of 1.92 µm and a viscosity of 27 mPa.s (Brookfield viscometer spindle 2 at 12 rpm). The polymer dispersion was washed to remove dispersant by being centrifuged and the supernatant liquid decanted off, water was added and the particles were redispersed by stirring. The centrifuging and decanting was repeated, and finally the polymer was redispersed in water by simple stirring to form a coating composition. This was applied to an aluminium panel and heated to 230° C. for 5 minutes to form a film having a thickness of 10 µm. The film formed in this way was compared to a film of the same thickness formed from the same polymer pellets dissolved in hot cyclohexanone to form a 15% solution by weight. Both films were tested for blush resistance by boiling in 3% aqueous acetic acid for 30 minutes. The flexibility of the film was assessed by a wedge test. Both films gave identical results showing that the process of the present invention has no damaging effect on the polymer.

EXAMPLE 2

An aqueous dispersion was prepared as follows. Pellets of high density polyethylene Eraclene MS80 from Enichem (melt flow index 35 g/10 min, 190° C., 2.16 kg) were added at a rate of 3 kg/hour to the inlet of a Leistritz co-rotating twin screw micro-18 GL 40D extruder, the screws rotating at 500 revolutions per minute. The eight heater zones in the extruder were set to the following temperature profile (in °C.) from inlet to outlet;

190-250-190-160-160-160-160-160.

In the third zone was an injection port through which was injected aqueous dispersant (Gohsenol GL05, 30% by weight in water) at 1 kg/hour. In the fifth zone was an injection port through which was injected water at 4 kg/hour, under pressure at 160° C. The dispersion was collected into a water-cooled pressurised vessel maintained under nitrogen at 7 bar and from which the dispersion, once cooled to below 100° C., could be periodically removed.

The resulting polymer dispersion had a median particle size of 11.00 µm and a viscosity of 44 mPa.s (Brookfield viscometer spindle 2 at 12 rpm).

EXAMPLE 3

An aqueous dispersion was prepared as follows. Pellets of crystalline polyester polymer 88EG™ from Bostik (7 parts) were mixed with a pigment paste masterbatch (1 part) comprising 88EG™ from Bostik (60%), pigment $TiO_2$ (RTC30 from Tioxide, 33%) and epoxidised linseed oil (Edenol B316 from Henkel, 7%). This was added at a rate of 2 kg/hour to the inlet of a Leistritz co-rotating twin screw micro-18 GL 40D extruder, the screws rotating at 300 revolutions per minute. The eight heater zones in the extruder were set to the following temperature profile (in °C.) from inlet to outlet;

180-280-250-160-160-160-160-160.

In the third zone was an injection port through which was injected aqueous dispersant (Gohsenol GL05, 30% by weight in water) at 1 kg/hour. In the fifth zone was an injection port through which was injected water at 3 kg/hour, under pressure at 160° C.

The dispersion was collected into a water-cooled pressurised vessel maintained under nitrogen at 7 bar and from which the dispersion, once cooled to below 100° C., could be periodically removed.

The resulting polymer dispersion had a median particle size of 5.74 μm and a viscosity of 59 mPas (Brookfield viscometer spindle 2 at 12 rpm).

What is claimed is:

1. A process for producing a dispersion of a polymer in an aqueous medium in which the polymer is dispersed in an aqueous medium in an extruder at a temperature above 100° C. in an extruder having an outlet wherein the pressure in the extruder is maintained above atmospheric so that the aqueous medium does not boil characterized by maintaining the pressure above atmospheric for the extruder at the outlet with a pressurized collection vessel and wherein aqueous dispersion from the extruder has at least 25% by weight of the aqueous medium where the aqueous medium has less than 40% by weight of organic solvent and wherein the aqueous dispersion enters the outlet and pressurized collection vessel at a pressure above atmospheric so that the aqueous medium does not boil and is subjected to the action of a cooling zone to lower the temperature of the aqueous dispersion to below 100° C. to have an aqueous dispersion with a viscosity below 10 Pa.s.

2. A process according to claim 1 which is carried out at a temperature of from 5 to 150° C. above the melting point of the polymer.

3. A process according to claim 2 in which the extruder is a continuous twin screw extruder.

4. A process according to claim 2 in which the polymer is a crystalline polyester or polyolefin.

5. A process according to claim 4 in which the polymer is a crystalline polyester.

6. A process according to claim 2 in which the polymer has a melting point above 130° C.

7. A process as claimed in claim 1 in which the aqueous medium also comprises a dispersant for the polymer.

8. A process as claimed in claim 7 in which the dispersant is at least partially hydrolysed polyvinyl alcohol.

* * * * *